(12) United States Patent
Huang et al.

(10) Patent No.: US 10,378,667 B2
(45) Date of Patent: Aug. 13, 2019

(54) VACUUM BREAKER

(71) Applicants:Chung-Yi Huang, Lukang Township, Changhua County (TW); Hsiang-Chien Huang, Lukang Township, Changhua County (TW)

(72) Inventors: Chung-Yi Huang, Lukang Township, Changhua County (TW); Hsiang-Chien Huang, Lukang Township, Changhua County (TW)

(73) Assignee: Chung-Yi Huang, Lukang Township (TW)

( * ) Notice: Subject to any disclaimer, the term of this patent is extended or adjusted under 35 U.S.C. 154(b) by 41 days.

(21) Appl. No.: 15/807,728

(22) Filed: Nov. 9, 2017

(65) Prior Publication Data
US 2019/0136995 A1   May 9, 2019

(51) Int. Cl.
*F16K 24/04* (2006.01)
*F16K 27/02* (2006.01)
*F16K 31/126* (2006.01)
*F16L 55/07* (2006.01)

(52) U.S. Cl.
CPC .............. *F16K 24/04* (2013.01); *F16K 27/02* (2013.01); *F16K 31/1262* (2013.01); *F16L 55/07* (2013.01)

(58) Field of Classification Search
CPC ...... F16K 27/02; F16K 31/1262; F16K 24/04; F16L 55/07; Y10T 137/3331
See application file for complete search history.

(56) References Cited

U.S. PATENT DOCUMENTS

| | | | | |
|---|---|---|---|---|
| 3,552,426 A | * | 1/1971 | Hester | F16K 24/06 137/375 |
| 4,669,497 A | * | 6/1987 | Tenhengel | E03C 1/104 137/218 |
| 4,712,575 A | * | 12/1987 | Lair | E03C 1/108 137/218 |
| 5,228,470 A | * | 7/1993 | Lair | E03C 1/106 137/218 |
| 5,228,471 A | * | 7/1993 | Hoeptner, III | E03B 9/025 137/218 |
| 5,876,017 A | * | 3/1999 | Becker | C23C 18/31 137/375 |
| 7,013,910 B2 | * | 3/2006 | Tripp | E03C 1/106 137/218 |

(Continued)

*Primary Examiner* — Eric Keasel
*Assistant Examiner* — Kevin R Barss
(74) *Attorney, Agent, or Firm* — Alan D. Kamrath; Mayer & Williams PC

(57) ABSTRACT

A vacuum breaker includes a main body, a bushing mounted in the main body, a braking member mounted in the main body and located above the bushing, a water stop gasket mounted in the main body and located above the braking member, an elastic member mounted in the main body and biased between the bushing and the braking member, a water inlet disk mounted in the main body and located above the water stop gasket, and a washer mounted in the main body and located above the water inlet disk. The vacuum breaker further includes a connection structure mounted between an inner circumference of the main body and an outer circumference of the bushing. The bushing is combined integrally with the main body by the connection structure under an external force and will not be detached from the main body.

11 Claims, 11 Drawing Sheets

(56) References Cited

U.S. PATENT DOCUMENTS

| | | | | |
|---|---|---|---|---|
| 7,204,492 B2* | 4/2007 | Hoyes | .................... | F16J 15/125 |
| | | | | 277/610 |
| 7,458,388 B2* | 12/2008 | Huang | ...................... | E03B 7/10 |
| | | | | 137/107 |
| 8,042,565 B2* | 10/2011 | Ball | ........................ | E03C 1/106 |
| | | | | 137/218 |
| 8,245,721 B2* | 8/2012 | Kuo | ...................... | F16L 15/008 |
| | | | | 137/217 |
| 8,470,101 B2* | 6/2013 | Kobayashi | ................ | C22C 1/10 |
| | | | | 148/434 |
| 9,982,792 B2* | 5/2018 | Kuo | .......................... | E03C 1/00 |

* cited by examiner

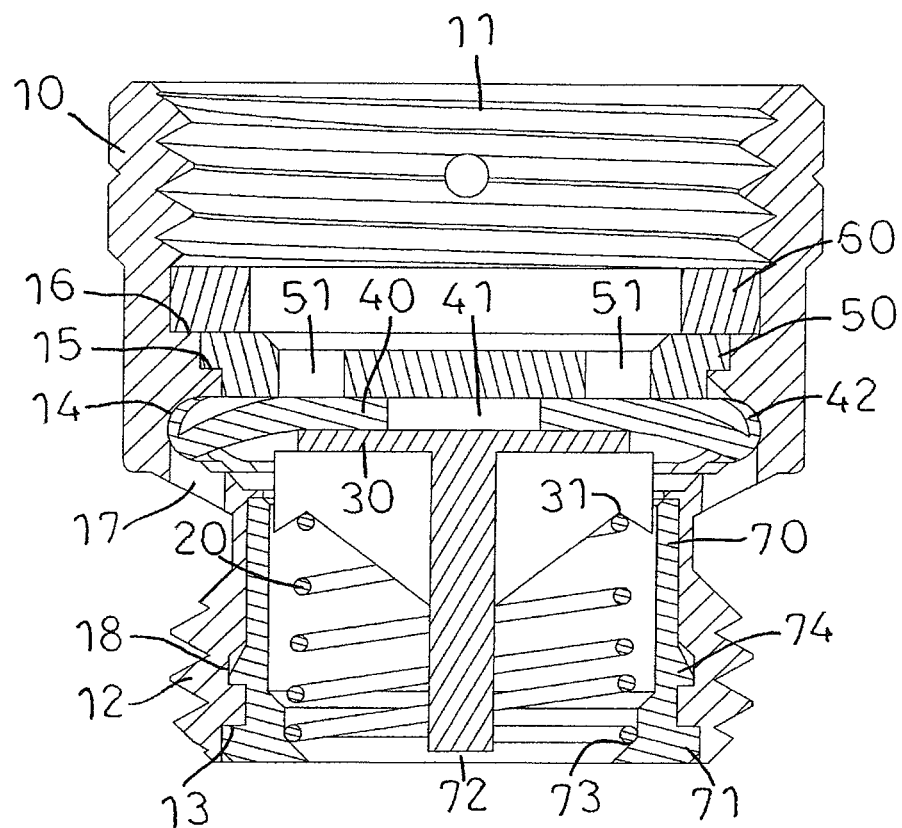
F I G. 4

VACUUM BREAKER

BACKGROUND OF THE INVENTION

1. Field of the Invention

The present invention relates to a breaker and, more particularly, to a vacuum breaker.

2. Description of the Related Art

A tube coupling is mounted between a water inlet pipe and a water outlet pipe. A vacuum breaker is mounted on the tube coupling and allows entrance of ambient air into the tube coupling. Thus, the vacuum breaker is used to break a vacuum state in the tube coupling between the water inlet pipe and the water outlet pipe, thereby preventing the water from staying in the tube coupling and the water outlet pipe, and thereby preventing the tube coupling and the water outlet pipe from being broken when the water freezes. A conventional vacuum breaker includes a body and a bushing. The body and the bushing are combined together by injection molding. The body is made of metallic material, and the bushing is made of plastic material. However, the bushing made of plastic material is easily deformed during the injection molding process due to the effect of thermal expansion and contraction, so that the bushing made of plastic material is easily stripped from the body made of metallic material, thereby producing water leakage. In addition, the body is made of leadless copper material, thereby increasing the cost of fabrication.

BRIEF SUMMARY OF THE INVENTION

In accordance with the present invention, there is provided a vacuum breaker comprising a main body, a bushing mounted in the main body, a braking member mounted in the main body and located above the bushing, a water stop gasket mounted in the main body and located above the braking member, an elastic member mounted in the main body and biased between the bushing and the braking member, a water inlet disk mounted in the main body and located above the water stop gasket, and a washer mounted in the main body and located above the water inlet disk. The bushing is made of plastic material. The main body is provided with a plurality of air vent holes corresponding to the water stop gasket and connected to an interior of the main body. The elastic member pushes the braking member toward the water stop gasket so that the braking member presses the water stop gasket. The water stop gasket has a center provided with a first water inlet hole. The water inlet disk has a periphery provided with a plurality of second water inlet holes misaligning with the first water inlet hole of the water stop gasket. The vacuum breaker further comprises a connection structure mounted between an inner circumference of the main body and an outer circumference of the bushing. The bushing is combined integrally with the main body by the connection structure under an external force.

According to the primary advantage of the present invention, the vacuum breaker comprises a connection structure mounted between the inner circumference of the main body and the outer circumference of the bushing, so that the bushing is combined integrally with the main body by the connection structure under an external force and will not be detached from the main body, thereby preventing the vacuum breaker from incurring water leakage.

According to another advantage of the present invention, the main body is made of copper material containing lead, thereby decreasing the cost of fabrication.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 4 is a cross-sectional view of the vacuum breaker in accordance with the first preferred embodiment of the present invention.

DETAILED DESCRIPTION OF THE INVENTION

Figure 1:
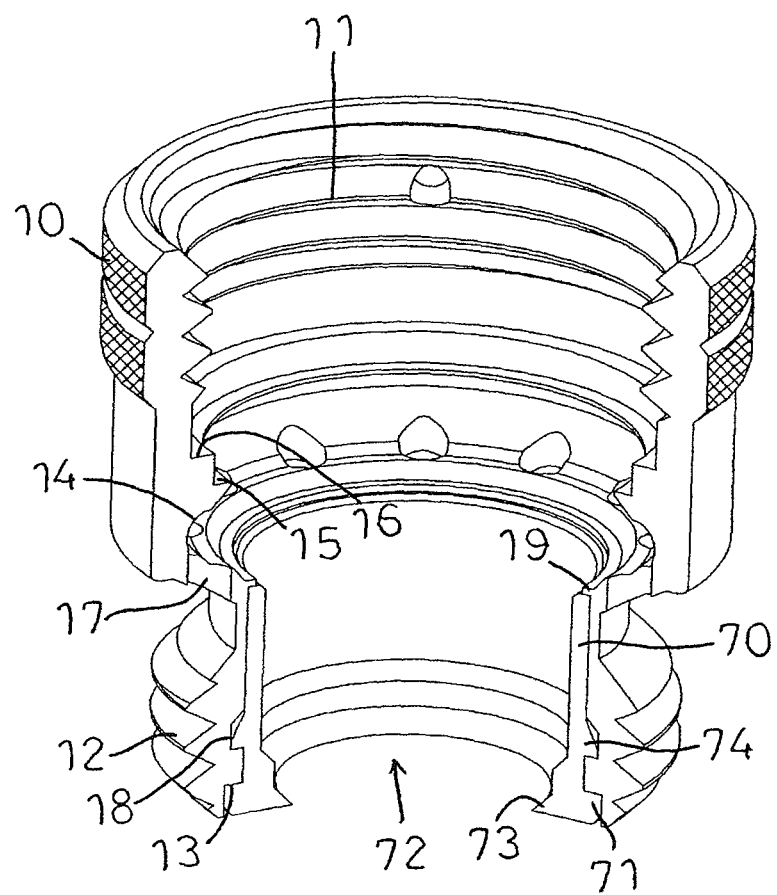
FIG. 1 is a partially perspective cross-sectional view of a vacuum breaker in accordance with the first preferred embodiment of the present invention.

Referring to the drawings and initially to FIGS. 1-4, a vacuum breaker in accordance with the preferred embodiment of the present invention comprises a main body 10, a bushing 70 mounted in the main body 10, a braking member 30 mounted in the main body 10 and located above the bushing 70, a water stop gasket 40 mounted in the main body 10 and located above the braking member 30, an elastic member 20 mounted in the main body 10 and biased between the bushing 70 and the braking member 30, a water inlet disk 50 mounted in the main body 10 and located above the water stop gasket 40, and a washer 60 mounted in the main body 10 and located above the water inlet disk 50.

The bushing 70 is made of plastic material. The bushing 70 has a center provided with a water outlet hole 72. The main body 10 is provided with a plurality of air vent holes 17 corresponding to the water stop gasket 40 and connected to an interior of the main body 10. The air vent holes 17 of the main body 10 are equally distant from each other. The elastic member 20 pushes the braking member 30 toward the water stop gasket 40 so that the braking member 30 presses the water stop gasket 40. The water stop gasket 40 has a center provided with a first water inlet hole 41. The water inlet disk 50 has a periphery provided with a plurality of second water inlet holes 51 misaligning with the first water inlet hole 41 of the water stop gasket 40.

The vacuum breaker further comprises a connection structure mounted between an inner circumference of the main body 10 and an outer circumference of the bushing 70. The bushing 70 is combined integrally with the main body 10 by the connection structure under an external force.

In the preferred embodiment of the present invention, the connection structure includes a positioning groove 18 formed in the inner circumference of the main body 10 and a positioning protrusion 74 formed on the outer circumference of the bushing 70. The positioning protrusion 74 of the bushing 70 is pushed upward and fit closely in the positioning groove 18 of the main body 10 under action of the external force.

In the preferred embodiment of the present invention, the water stop gasket 40 is made of resilient material.

In the preferred embodiment of the present invention, the elastic member 20 is a compression spring.

In the preferred embodiment of the present invention, the braking member 30 has a bottom provided with a plurality of upper retaining portions 31. The bushing 70 has a lower end provided with a lower retaining portion 73. The elastic member 20 has an upper end resting on the upper retaining portions 31 of the braking member 30 and a lower end resting on the lower retaining portion 73 of the bushing 70.

In the preferred embodiment of the present invention, the main body 10 has a first end provided with an internal thread 11 and a second end provided with an external thread 12. The washer 60 is located between the internal thread 11 of the main body 10 and the water inlet disk 50. The positioning groove 18 of the main body 10 corresponds to the external thread 12. A first pipe is screwed into the internal thread 11 of the main body 10 and presses the washer 60, and a second pipe is screwed onto the external thread 12 of the main body 10.

In the preferred embodiment of the present invention, the water stop gasket 40 is located between the braking member 30 and the water inlet disk 50 and has a periphery provided with an arcuate lip 42 curved upward. The water inlet disk 50 is located between the washer 60 and the water stop gasket 40.

In the preferred embodiment of the present invention, the interior of the main body 10 is provided with a protruding edge 19, a first stepped edge 13, a second stepped edge 14, a third stepped edge 15 and a fourth stepped edge 16. The bushing 70 has an upper end resting on the protruding edge 19 of the main body 10. The lower end of the bushing 70 is provided with an outer flange 71 resting on the first stepped edge 13 of the main body 10. Thus, the bushing 70 is located between the protruding edge 19 and the first stepped edge 13 of the main body 10. The water stop gasket 40 rests on the second stepped edge 14 of the main body 10. The water inlet disk 50 rests on the third stepped edge 15 of the main body 10. The washer 60 rests on the fourth stepped edge 16 of the main body 10. The air vent holes 17 of the main body 10 correspond to the second stepped edge 14 of the main body 10.

In the preferred embodiment of the present invention, the main body 10 is made of leadless copper material. Alternatively, the main body 10 is made of copper material containing lead.

In operation, when water from the first pipe flows into the main body 10, the water in turn flows through the washer 60 and the second water inlet holes 51 of the water inlet disk 50 to press the water stop gasket 40 downward, so that the water stop gasket 40 is pushed downward to close the air vent holes 17 of the main body 10. The water then flows through the first water inlet hole 41 of the water stop gasket 40 to push the braking member 30 downward and to compress the elastic member 20. The water then flows through the water outlet hole 72 of the bushing 70 into the second pipe and finally flows outward from the second pipe.

Figure 2:
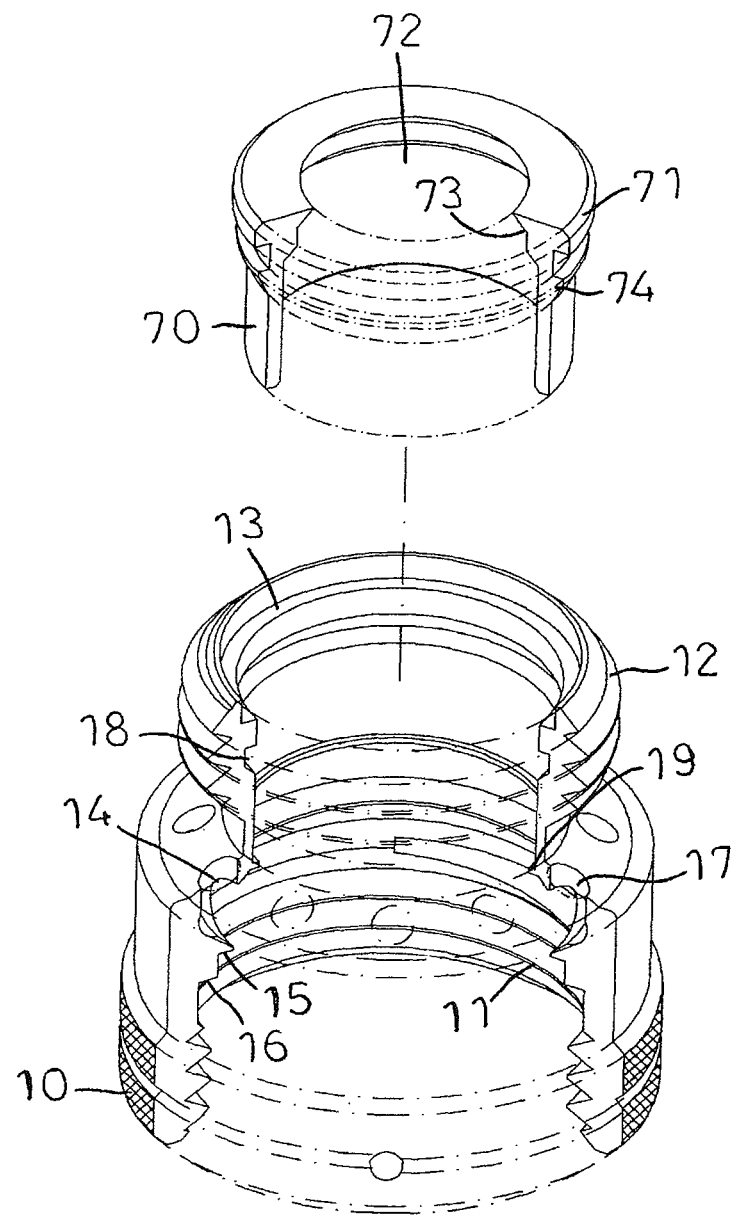
FIG. 2 is an exploded perspective view of the vacuum breaker as shown in FIG. 1.
Figure 3:
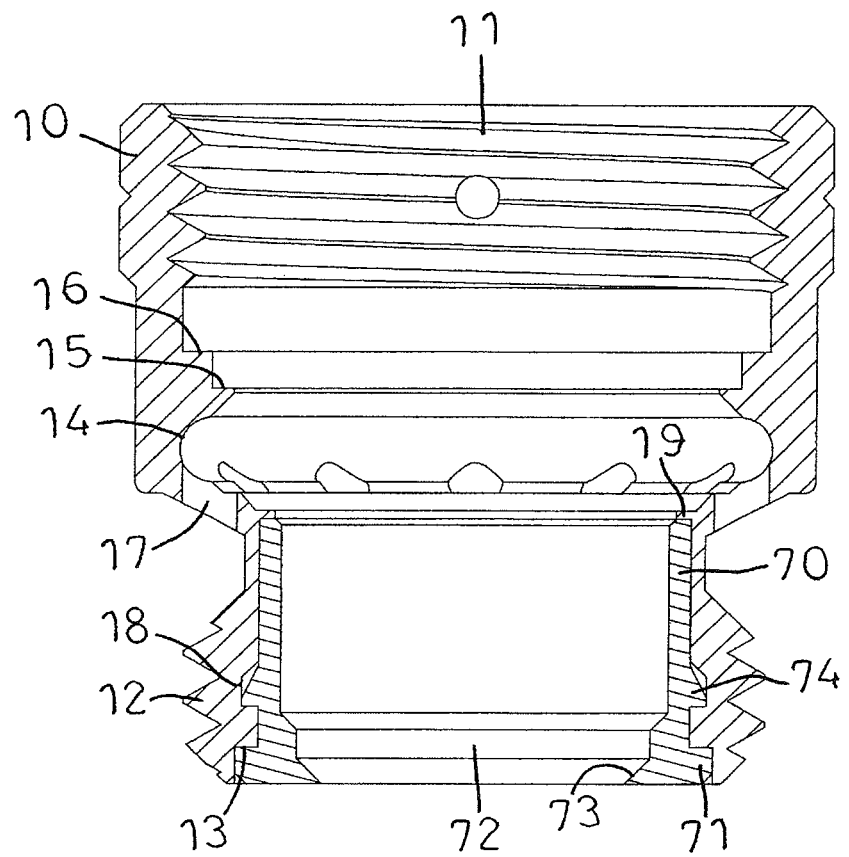
FIG. 3 is a cross-sectional view of the vacuum breaker as shown in FIG. 1.

On the contrary, referring to FIG. 4 with reference to FIGS. 1-3, when the water from the first pipe stops flowing into the main body 10, the elastic member 20 pushes the braking member 30 which pushes the water stop gasket 40 upward so that the water stop gasket 40 is moved upward to open the air vent holes 17 of the main body 10. In such a manner, ambient air flows through the air vent holes 17 of the main body 10 into the second pipe to break a vacuum state in the main body 10, so that the water remaining in the main body 10 is drained outward from the second pipe, thereby preventing the water from staying in the main body 10, and thereby preventing the second pipe from being broken when the water freezes.

Accordingly, the vacuum breaker comprises a connection structure mounted between the inner circumference of the main body 10 and the outer circumference of the bushing 70, so that the bushing 70 is combined integrally with the main body 10 by the connection structure under an external force and will not be detached from the main body 10, thereby preventing the vacuum breaker from incurring water leakage. In addition, the main body 10 is made of copper material containing lead, thereby decreasing the cost of fabrication.

Referring to FIGS. 5-8, the bushing 90 has a center provided with a water outlet hole 91. The bushing 90 has a lower end provided with a lower retaining portion 92. The elastic member 20 has an upper end resting on the upper retaining portions 31 of the braking member 30 and a lower end resting on the lower retaining portion 92 of the bushing 90. The main body 80 is provided with a plurality of air vent holes 86 corresponding to the water stop gasket 40 and connected to an interior of the main body 80. The main body 80 has a first end provided with an internal thread 81 and a second end provided with an external thread 82. A first pipe is screwed into the internal thread 81 of the main body 80, and a second pipe is screwed onto the external thread 82 of the main body 80. The interior of the main body 80 is provided with a stepped edge 83 for receiving the water stop gasket 40, a stepped edge 84 for receiving the water inlet disk 50, and a stepped edge 85 for receiving the washer 60.

The connection structure includes a positioning protrusion 87 formed on the inner circumference of the main body 80 and a positioning groove 93 formed in the outer circumference of the bushing 90. The positioning groove 93 of the bushing 90 is pushed downward and fit closely on the positioning protrusion 87 of the main body 80 under action of the external force.

In operation, when water from the first pipe flows into the main body 80, the water in turn flows through the washer 60 and the second water inlet holes 51 of the water inlet disk 50 to press the water stop gasket 40 downward, so that the water stop gasket 40 is pushed downward to close the air vent holes 86 of the main body 80. The water then flows through the first water inlet hole 41 of the water stop gasket 40 to push the braking member 30 downward and to compress the elastic member 20. The water then flows through the water outlet hole 91 of the bushing 90 into the second pipe and finally flows outward from the second pipe.

Figure 5:
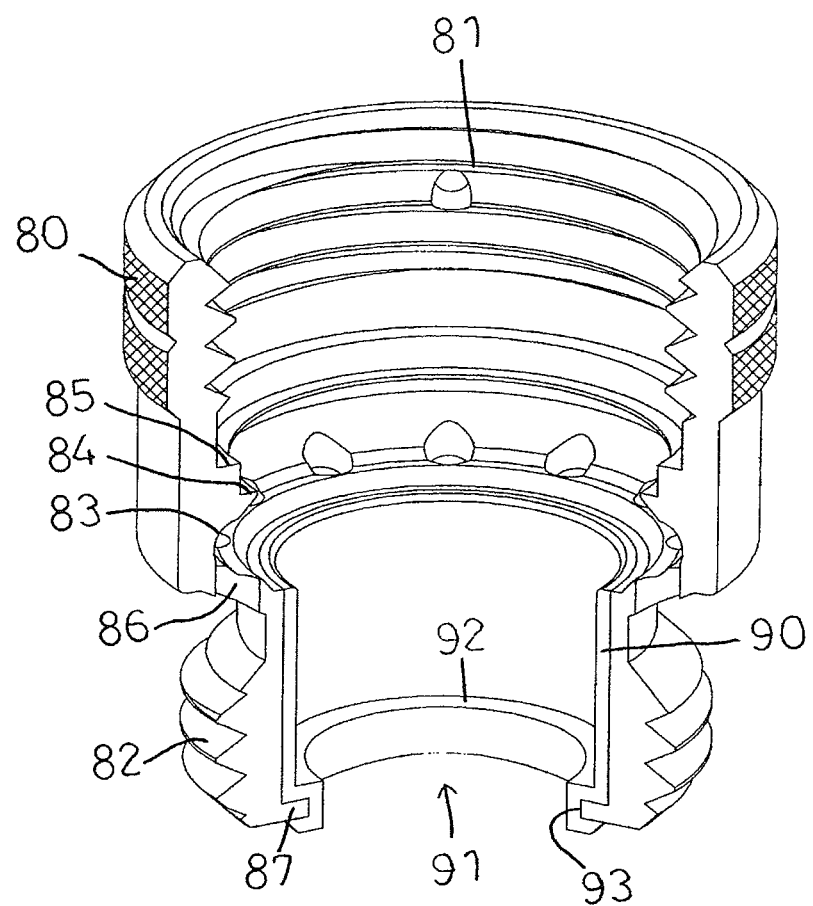
FIG. 5 is a partially perspective cross-sectional view of a vacuum breaker in accordance with the second preferred embodiment of the present invention.
Figure 6:
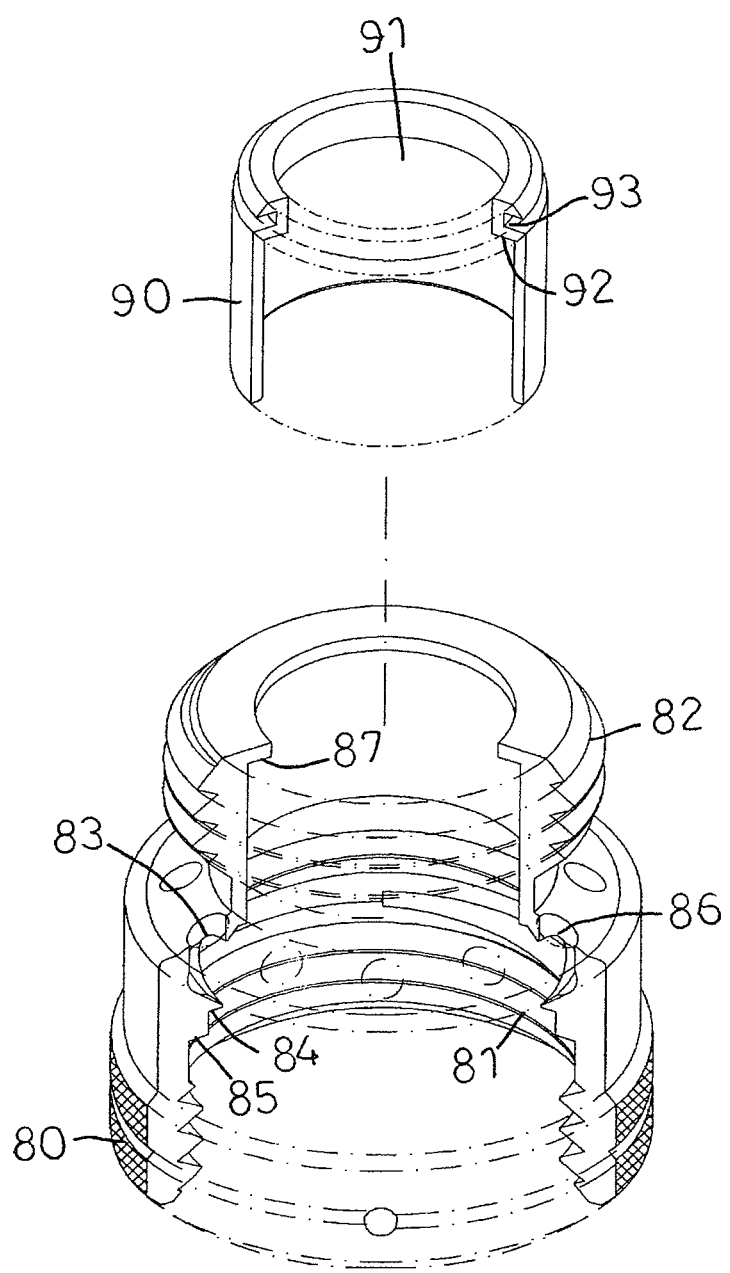
FIG. 6 is an exploded perspective view of the vacuum breaker as shown in FIG. 5.
Figure 7:
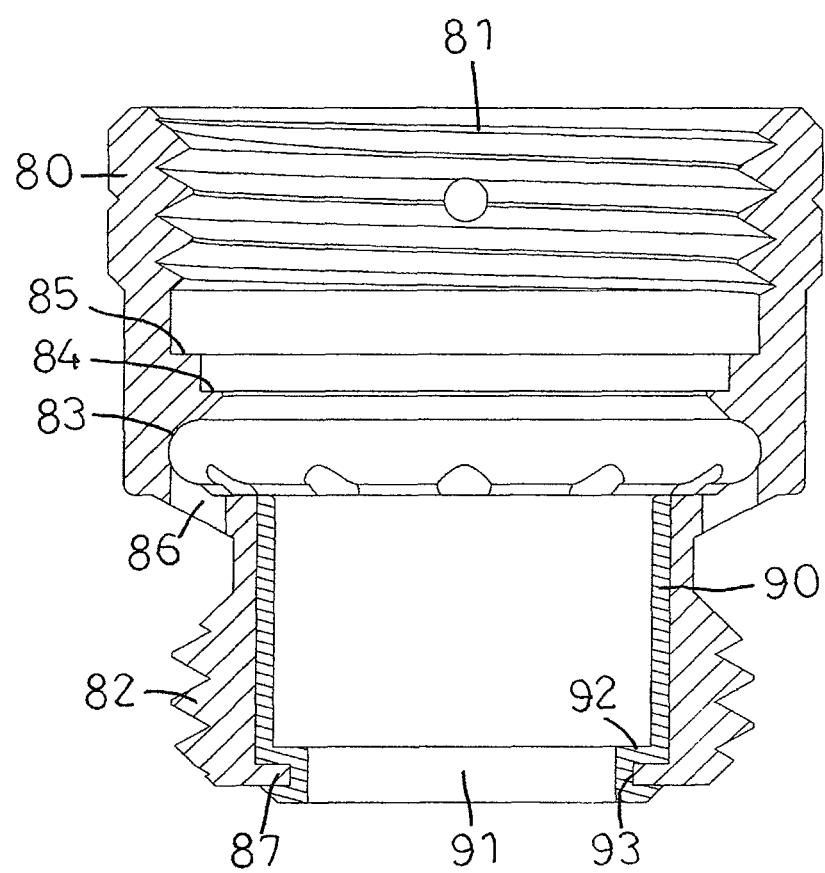
FIG. 7 is a cross-sectional view of the vacuum breaker as shown in FIG. 5.
Figure 8:
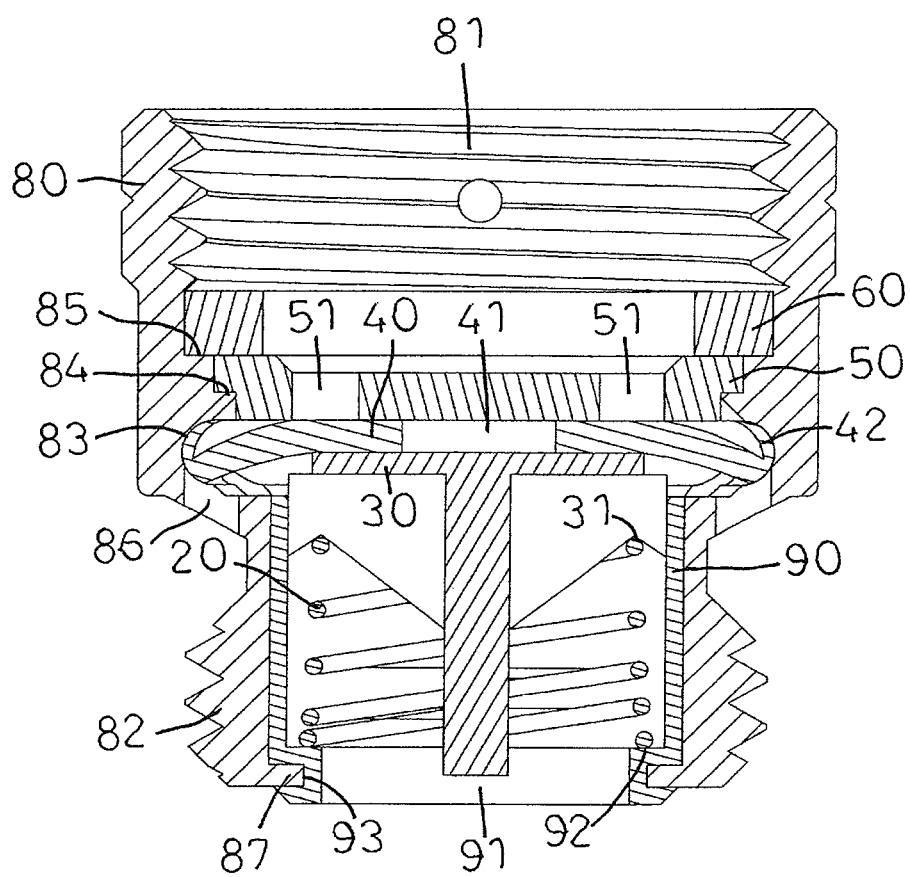
FIG. 8 is a cross-sectional view of the vacuum breaker in accordance with the second preferred embodiment of the present invention.

On the contrary, referring to FIG. 8 with reference to FIGS. 5-7, when the water from the first pipe stops flowing into the main body 80, the elastic member 20 pushes the braking member 30 which pushes the water stop gasket 40 upward so that the water stop gasket 40 is moved upward to open the air vent holes 86 of the main body 80. In such a manner, ambient air flows through the air vent holes 86 of the main body 80 into the second pipe to break a vacuum state in the main body 80, so that the water remaining in the main body 80 is drained outward from the second pipe, thereby preventing the water from staying in the main body 80, and thereby preventing the second pipe from being broken when the water freezes.

Figure 9:
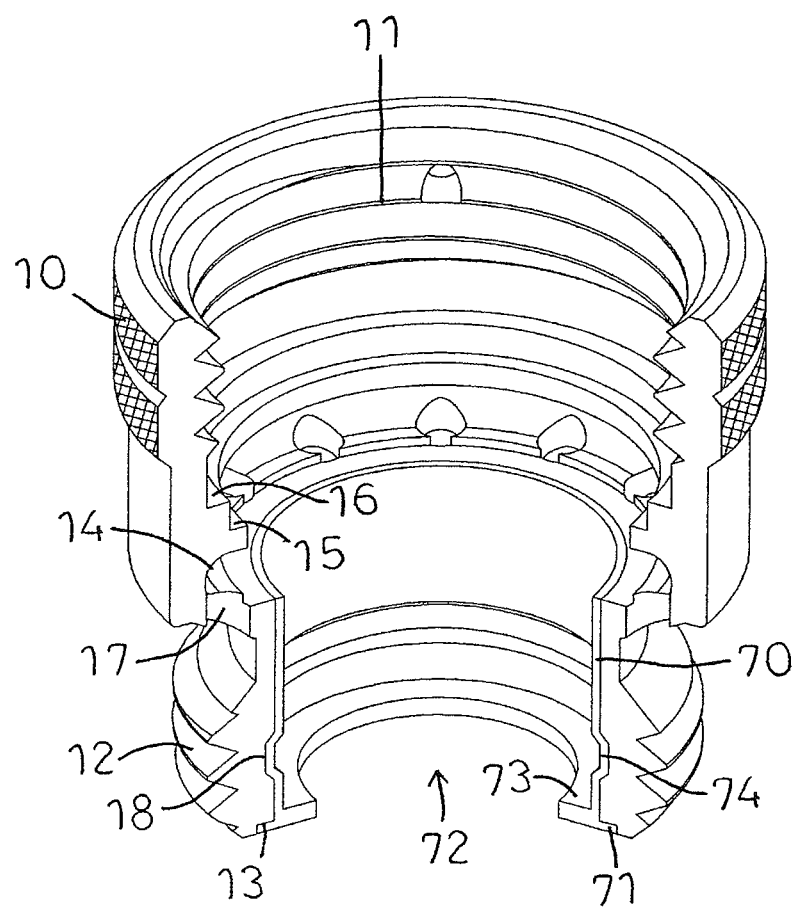
FIG. 9 is a partially perspective cross-sectional view of a vacuum breaker in accordance with the third preferred embodiment of the present invention.
Figure 10:
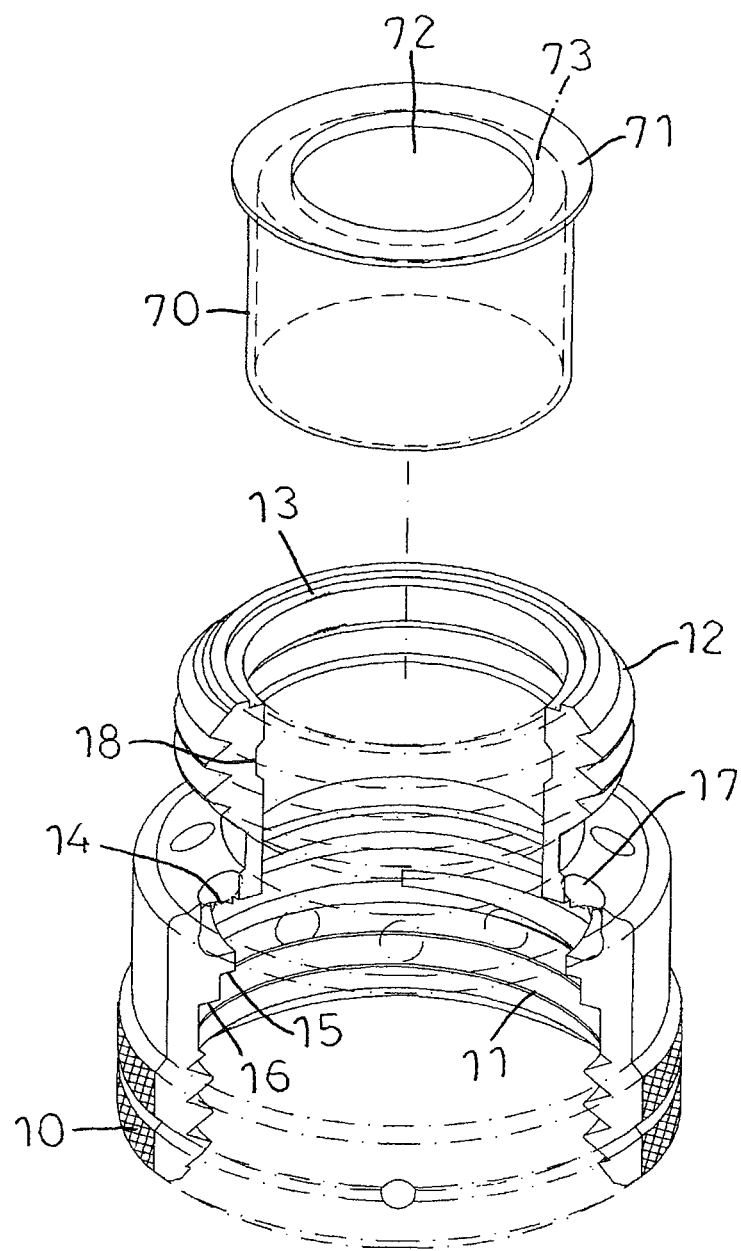
FIG. 10 is an exploded perspective view of the vacuum breaker as shown in FIG. 9.
Figure 11:
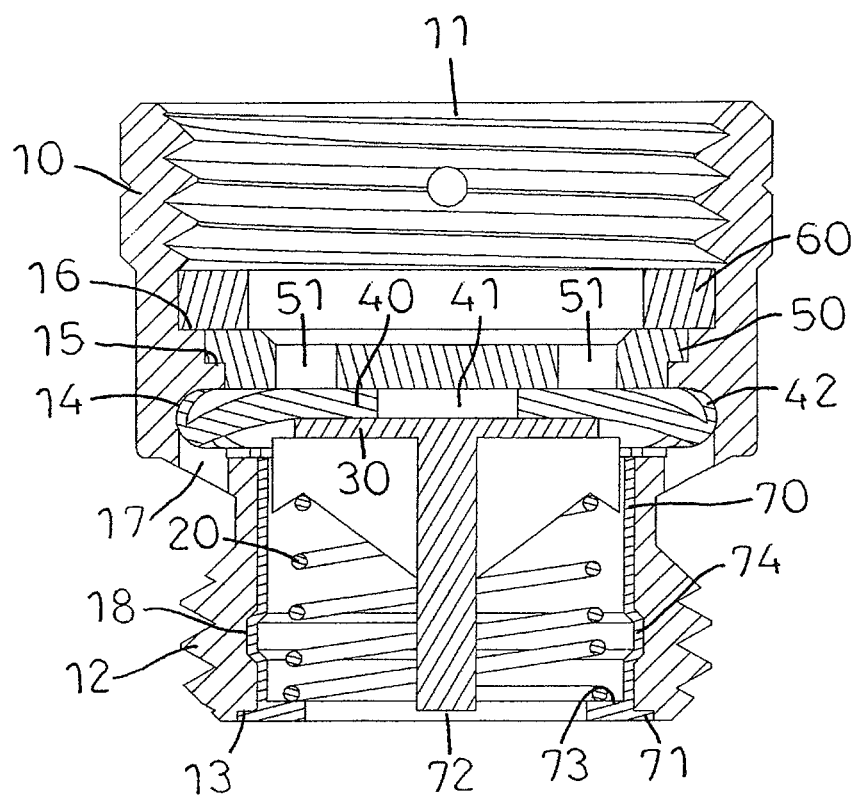
FIG. 11 is a cross-sectional view of the vacuum breaker in accordance with the third preferred embodiment of the present invention.

Referring to FIGS. 9-11, the protruding edge 19 of the main body 10 is undefined. In addition, the positioning groove 18 is formed in the inner circumference of the main body 10, and the bushing 70 is extruded outward by an oil pressure to form the positioning protrusion 74, so that the positioning protrusion 74 of the bushing 70 is fit closely in and combined integrally with the positioning groove 18 of the main body 10.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A vacuum breaker comprising:
a main body;
a bushing mounted in the main body;
a braking member mounted in the main body and located above the bushing;
a water stop gasket mounted in the main body and located above the braking member;
an elastic member mounted in the main body and biased between the bushing and the braking member;
a water inlet disk mounted in the main body and located above the water stop gasket; and
a washer mounted in the main body and located above the water inlet disk;
wherein:
the bushing is made of plastic material;
the main body is provided with a plurality of air vent holes corresponding to the water stop gasket and connected to an interior of the main body;
the elastic member pushes the braking member toward the water stop gasket so that the braking member presses the water stop gasket;
the water stop gasket has a center provided with a first water inlet hole;
the water inlet disk has a periphery provided with a plurality of second water inlet holes misaligning with the first water inlet hole of the water stop gasket;
the vacuum breaker further comprises a connection structure mounted between an inner circumference of the main body and an outer circumference of the bushing;
the bushing is combined integrally with the main body by the connection structure under an external force; and
the water stop gasket is located between the braking member and the water inlet disk, and has a periphery provided with an arcuate lip curved upward.

2. The vacuum breaker of claim 1, wherein:
the connection structure includes a positioning groove formed in the inner circumference of the main body and a positioning protrusion formed on the outer circumference of the bushing; and
the positioning protrusion of the bushing is pushed upward and fit closely in the positioning groove of the main body under action of the external force.

3. The vacuum breaker of claim 1, wherein:
the connection structure includes a positioning protrusion formed on the inner circumference of the main body and a positioning groove formed in the outer circumference of the bushing; and
the positioning groove of the bushing is pushed downward and fit closely on the positioning protrusion of the main body under action of the external force.

4. The vacuum breaker of claim 2, wherein the bushing is extruded outward by an oil pressure to form the positioning protrusion, so that the positioning protrusion of the bushing is fit closely in and combined integrally with the positioning groove of the main body.

5. The vacuum breaker of claim 1, wherein the water stop gasket is made of resilient material.

6. The vacuum breaker of claim 1, wherein the elastic member is a compression spring.

7. The vacuum breaker of claim 1, wherein:
the braking member has a bottom provided with a plurality of upper retaining portions;
the bushing has a lower end provided with a lower retaining portion; and
the elastic member has an upper end resting on the upper retaining portions of the braking member and a lower end resting on the lower retaining portion of the bushing.

8. The vacuum breaker of claim 1, wherein:
the main body has a first end provided with an internal thread and a second end provided with an external thread;
the washer is located between the internal thread of the main body and the water inlet disk;
a first pipe is screwed into the internal thread of the main body and presses the washer; and
a second pipe is screwed onto the external thread of the main body.

9. The vacuum breaker of claim 1, wherein the main body is made of leadless copper material.

10. The vacuum breaker of claim 1, wherein the main body is made of copper material containing lead.

11. A vacuum breaker comprising:
a main body;
a bushing mounted in the main body;
a braking member mounted in the main body and located above the bushing;
a water stop gasket mounted in the main body and located above the braking member;
an elastic member mounted in the main body and biased between the bushing and the braking member;
a water inlet disk mounted in the main body and located above the water stop gasket; and
a washer mounted in the main body and located above the water inlet disk;
wherein:
the bushing is made of plastic material;
the main body is provided with a plurality of air vent holes corresponding to the water stop gasket and connected to an interior of the main body;
the elastic member pushes the braking member toward the water stop gasket so that the braking member presses the water stop gasket;
the water stop gasket has a center provided with a first water inlet hole;

the water inlet disk has a periphery provided with a plurality of second water inlet holes misaligning with the first water inlet hole of the water stop gasket;

the vacuum breaker further comprises a connection structure mounted between an inner circumference of the main body and an outer circumference of the bushing;

the bushing is combined integrally with the main body by the connection structure under an external force;

the interior of the main body is provided with a protruding edge, a first stepped edge, a second stepped edge, a third stepped edge and a fourth stepped edge;

the bushing has an upper end resting on the protruding edge of the main body and has a lower end provided with an outer flange resting on the first stepped edge of the main body;

the water stop gasket rests on the second stepped edge of the main body;

the water inlet disk rests on the third stepped edge of the main body; and the washer rests on the fourth stepped edge of the main body.

\* \* \* \* \*